Sept. 8, 1936.  J. J. BROWN  2,053,460
LIQUID GAUGE
Filed Sept. 25, 1935
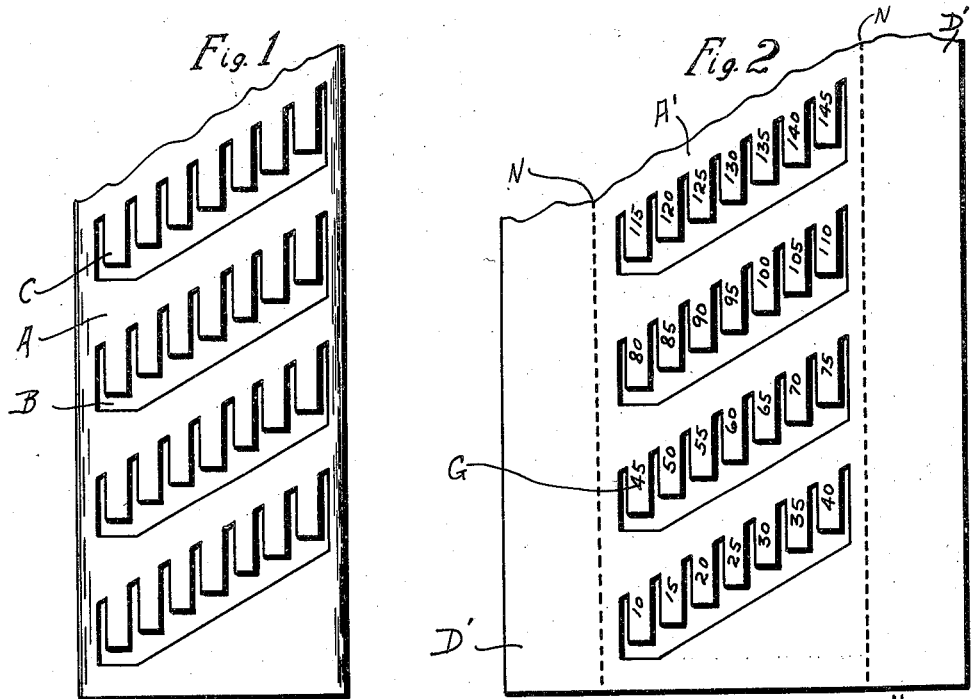
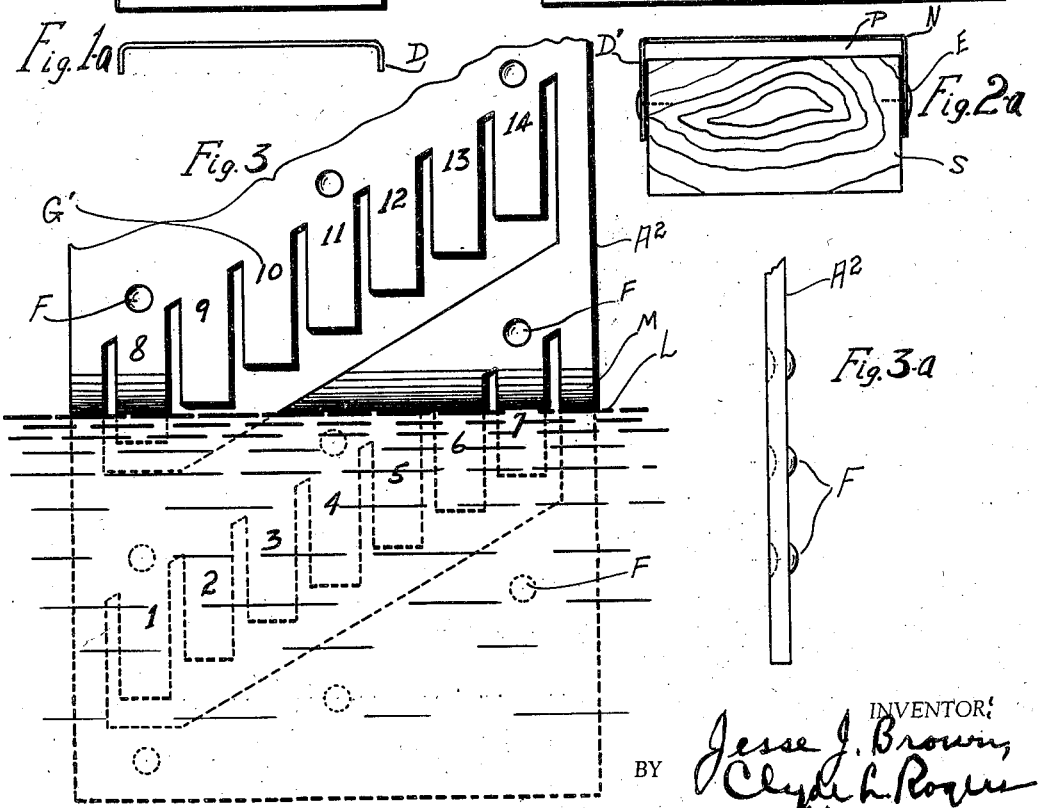
INVENTOR:
Jesse J. Brown,
BY Clyde L. Rogers
his ATTORNEY.

Patented Sept. 8, 1936

2,053,460

UNITED STATES PATENT OFFICE 2,053,460

LIQUID GAUGE

Jesse J. Brown, Syracuse, N. Y.

Application September 25, 1935, Serial No. 42,099

7 Claims. (Cl. 73—120)

This invention relates to gauges or ullage sticks for measuring the level of liquid in containers, and while having other and more general fields of usefulness, is well adapted for determining the level of gasoline in storage tanks. Particularly at filling stations, the necessity for an accurate check of the tanks' contents often arises, as when replenishing the supply, to check the amount delivered, or when changing crews at the station and other cases. In present practice, measurement of the amount of gasoline in such tanks is usually made by means of a wooden stick of rectangular cross-section having graduations imprinted or stamped thereon. An accurate reading of the contents of the tank is not possible with such wooden stick method principally on account of the action of capillary attraction which causes the "wet line," or "reading" to spread or blurr. These sticks are usually painted a dull black when new but the paint does not endure and the reading is then even more uncertain. These wooden sticks are used primarily on account of safety as there is then no danger of striking a spark while inserting the stick in the tank, wooden sticks being also much cheaper. Ullage sticks are also made of brass, aluminum or other materials which will not readily strike a spark, but the cost thereof is relatively high, and as usually made the objections above noted due to capillary attraction will exist at least in some degree.

The principal object of the present invention is to obviate the ill effects of capillary attraction and prevent the same from altering or blurring the indication given by the liquid level on the gauge and permitting a substantially accurate reading to be had at leisure and without the necessity of haste as is necessary in ullage sticks where capillary attraction quickly operates to alter the reading. In the ullage stick or gauge of my invention, the action of capillary attraction is made an asset rather than a detriment and I preferably produce my gauge of cardboard stock wherein the capillary attraction is pronounced, although other materials than cardboard may be employed. The invention will be better understood from the following detailed description taken in connection with the accompanying drawing and, the distinctive features of novelty will be thereafter pointed out in the appended claims.

Referring to the drawing:

Figure 1 is an elevation of a gauge device embodying the invention, the upper portion thereof being broken away;

Figure 1a is an end view thereof;

Figure 2 is a similar partial elevation showing a slightly different form of the invention;

Figure 2a is an end view thereof showing the strip bearing the points with the sides thereof bent inward and secured to a stick;

Figure 3 is a similar view on a relatively larger scale of a further slight modification and showing the device in use and immersed in a liquid body; and Figure 3a is a partial edge view of the form of Figure 3.

In accordance with my invention, each reading point or graduation of the gauge is made in the form of a finger or tooth, projecting downward, and these teeth are arranged to be isolated from one another and from the rest of the gauge excepting only at the upper end of the tooth where it is supported in depending relation from the body of the gauge. In Figure 1, A denotes a strip of thin sheet material which may be of cardboard or the like, or it may be of brass or like metal in which case it is preferably painted with a dull black lacquer or other suitable coating. This strip has a series of vertically spaced cut-out portions B, providing a series of spaced apart depending teeth or fingers C, which are isolated from one another and from the member A, except at the tops thereof. These fingers or teeth are arranged in a series of vertically spaced apart steps constituting graduations from the bottom of the gauge upward. The vertical spacings or steppings of the lower ends of these teeth which constitute the graduations of the gauge may be as close together as desired. They may be made to correspond to a definite number of gallons for each specific tank, or they may be made all at equal distances apart, vertically, and each tooth numbered, each number in such case being shown on a wall chart as indicating a certain quantity of liquid for a particular tank. In the latter case, the same gauge might be used for tanks of different sizes and shapes provided a proper chart is at hand for each different tank. In the form of Figures 1 and 1a, the side edges of the strip are turned in as indicated at D to provide stiffness and rigidity, the strip thus formed when made of strong material such as metal being sufficiently rigid for use without a wooden or like backing stick. In Figure 2, I show a form wherein the sheet strip A' is formed with lateral extensions D' of fairly substantial width adapted for folding inward along score lines N, these side folds D' being adapted to being secured to a wooden or other stick S by thumb tacks or the like E. The strip is thus secured to the stick with its body portion spaced away from the surface of the stick as indicated at P so that the stick may not provide a path for the liquid to cross the spacing between the teeth to thus give a wrong indication. In this form the individual teeth are shown as marked with graduations G in the form of numerals which may be read to indicate directly the number of gallons or other measurement units in the tank. In Figures 3 and 3a, I show a form wherein the sheet strip $A^2$ is formed with small bosses or projections F so that when it is secured to the stick, the teeth are in like manner kept spaced from the stick. In this form, the indicia G' on the teeth comprises numbers or other arbitrary characters which may refer to a proper chart. Such a wall chart provided for use therewith would of course indicate the readings in gallons corresponding to the number on each tooth. While in the forms shown, the vertical spacing of successive teeth is equal throughout as would be the case for a rectangular tank or any tank whose side walls were parallel, it will be understood that for cylindrical or other forms of tank the spacing of the teeth would be correspondingly varied.

It will be understood that when the gauge is inserted in the tank, the uppermost tooth, i. e., as shown, the tooth with the marking 8 that touches the liquid level L becomes wet, and the effect of capillary attraction instead of being a drawback, is an aid in the use of the device since it insures that such uppermost tooth that touches the liquid will be wet enough so as to be easily noticeable. The particular dimension and length of the teeth shown is merely illustrative and it is only essential that these teeth be long enough so that the liquid will not pass from one to another by the capillary attraction, and the spacing of the teeth apart only needs to be sufficient so that there will be no likelihood of bridging of the liquid across the spaces between the teeth. It will be understood that in use, several different types of paper or cardboard gauge strips A' may be used at different times with the same wooden stick S. The gauge strips of my invention when produced of paper or cardboard or other cheap material, may conveniently be marketed in rolled-up form and thus readily handled and available for use as required. Different materials, coatings, or colors may be used as best adapted for specific liquids to obtain most satisfactory results.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having now described my invention, what I claim as new and desire to secure by Letters Patent is:

1. A gauge for measuring the level of liquid in a container equipped with graduations in the form of fingers having a common support and projecting downward therefrom, a substantial portion of the lower extent of said fingers being isolated from one another.

2. A gauge for measuring the level of liquid in a container comprising a strip of sheet material, a stick to which said strip is secured, said strip being formed to embody a plurality of measuring teeth projecting downward, the lower ends of said teeth being spaced at different levels, and spacing means to keep the lower part of said teeth spaced from said stick.

3. A gauge for measuring the level of liquid in a container comprising a strip of sheet material having turned side edges, a stick to which said side edges are secured so that said strip is held away from the stick, said strip formed to embody a plurality of measuring teeth projecting downward, the lower ends of said teeth being spaced away from said stick.

4. A gauge for measuring the level of liquid in a container comprising a strip of sheet material adapted to be fastened to a stick or the like, said strip formed to provide a plurality of measuring teeth projecting downward, the lower ends of said teeth being spaced at different levels and the lower portions of said teeth being free from contact with any other part of the gauge.

5. A gauge for measuring the level of liquid in a container comprising a strip of metal, having a side edge thereof bent to provide stiffness, and a plurality of fingers formed on said strip projecting downward, the lower tips of said teeth forming the graduations of the gauge, and the lower portions of the fingers being free from contact with any other part of the gauge.

6. A gauge for measuring the level of liquid in a container comprising a strip of pervious sheet material formed to embody a plurality of measuring teeth projecting downward with the lower ends of said teeth spaced at different levels and isolated one from another.

7. A gauge for measuring the level of liquid in a container having graduations in the form of fingers projecting downward from a common support.

JESSE J. BROWN.